Oct. 3, 1933.    M. VIDMAR    1,929,128

WEEDING HOE

Filed Aug. 18, 1932

Inventor
M. Vidmar.
By L. F. Randolph Jr.
Attorney

Patented Oct. 3, 1933

1,929,128

UNITED STATES PATENT OFFICE 1,929,128

WEEDING HOE

Michael Vidmar, Somerset, Colo.

Application August 18, 1932. Serial No. 629,351

3 Claims. (Cl. 97—68)

The invention relates to implements used for eradicating weeds, and has for its object the provision of an improved construction of manually operated implement adapted for cutting the soil under the surface to cut the weed roots therein, and provided with means to pulverize the soil in operation of the implement, said means also providing for removal of the weed roots from the soil.

A further object of the invention is the provision of a hand operated implement including a flat blade having laterally extending wings arranged at an angle to one another, the front sides of said wings being sharpened to cut into the soil, the rear edges being unsharpened to prevent injuring the plants by contact therewith when retracting the implement, the outer ends of the wings being tapered, providing points adapted to operate between plants in a row conveniently, and the top side of the blade having a handle shank secured thereto and spaced inwardly and rearwardly inclined prongs, said shank and the prongs providing means for breaking up the soil in forward movement of the implement, and the prongs providing a rake for removal of weed roots in retracting movement of the implement.

Figure 1:
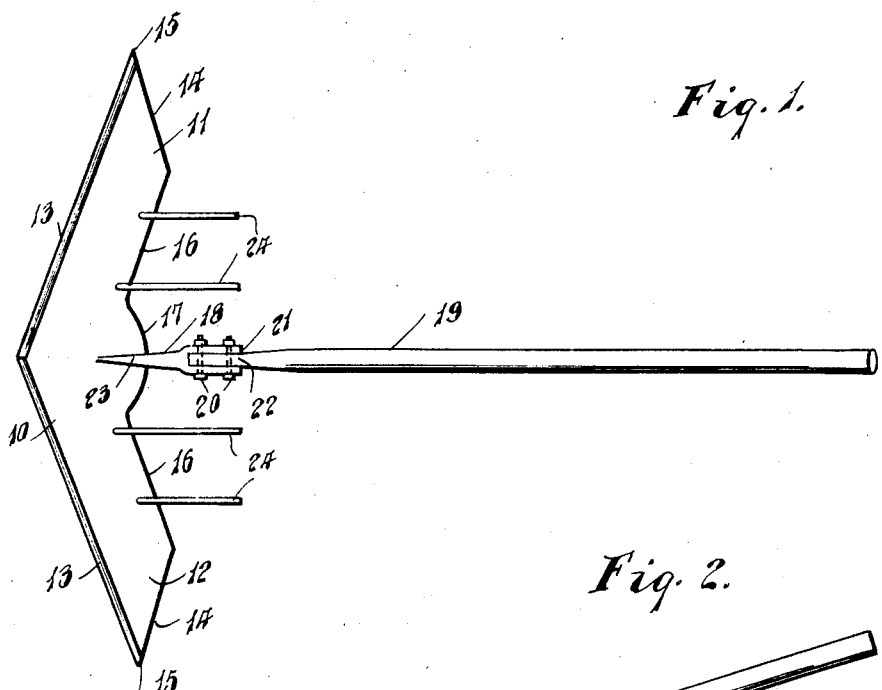
Figure 2:
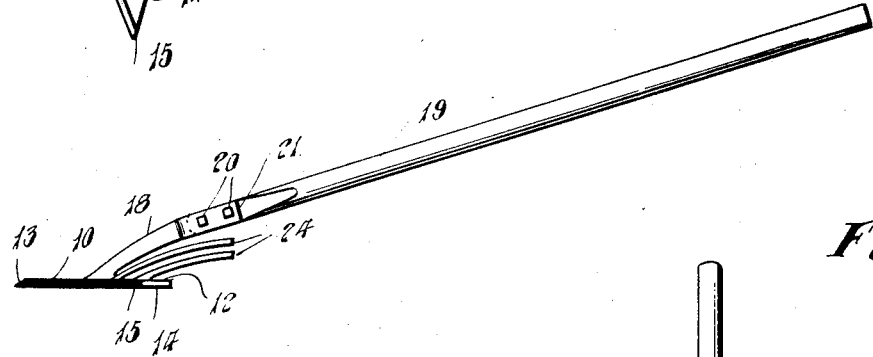
Figure 3:
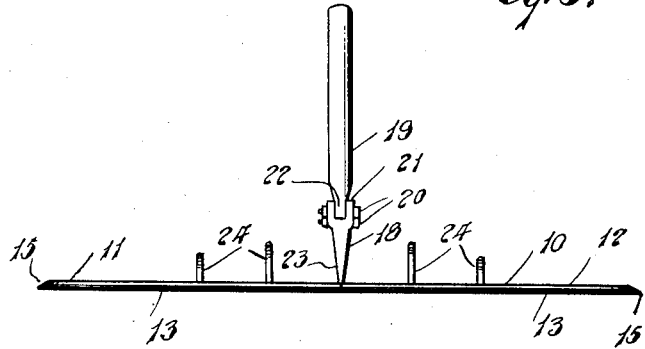

The invention will be described in detail hereinafter and will be found illustrated in the accompanying drawing, in which Figure 1 is a top plan view of the improved weeding hoe, Figure 2 is a side view in elevation, and Figure 3 is a front view.

In the drawing similar reference characters are used to designate corresponding parts in all of the views.

The improved weeding hoe includes a blade 10, having two laterally extending wings 11 and 12, with their front sides at an angle to one another, and sharpened as shown at 13. The rear sides of the wings adjacent to the outer end thereof, and designated 14 are arranged at an acute angle to the sharpened front edges 13 so as to provide sharp points 15 that are adapted to enter between plants in a row, even though they may be closely planted, for cutting out of weeds therebetween. The rear sides of the ends of the blades 14, are unsharpened so that engagement therewith with the stalk of a plant will not harm it, and making it necessary for the operator to watch only the sharpened edge in entering the implement between plants in a row.

The rear sides of the wings have also edges 16 that are substantially parallel to the sharpened front edges 13, and these edges 16 are connected by a curved edge 17 providing a reinforcement for the blade intermediate of the ends thereof. Secured intermediate of the ends of the wings is a handle shank 18 to which is secured a handle 19 by means of bolts and nuts 20 engaging through a bifurcated portion of the shank 21 and a reduced portion 22 of the handle. The shank 18 is secured to the blade and tapered as shown at 23, and the smallest portion of the shank is secured to the blade, this providing for use of the shank to assist in breaking up the soil in forward movement of the blade during operation. Also secured to the top side of the blade 10 are a plurality of prongs 24, said prongs being spaced from one another and from the shank 18 and as shown in Figure 2 the prongs 24 are inclined upwardly and rearwardly from the blade 10, and are preferably curved as shown in Figure 2.

In operation with the implement, the blade 10 is pushed forwardly into the soil so as to sever any weed roots therein, the shank 18 and prongs 24 serving to break up the soil during movement of the blade in a forward direction, and the prongs 24 furthermore serve to engage the standing portions of the weeds and the roots and act as a rake in retracted movements of the blade to remove the weeds and roots.

What is claimed is:—

1. In a weeding hoe, a flat blade adapted for operation in a substantially horizontal position and for subsurface root cutting, said blade having laterally extending wings arranged at an angle to one another and with their front edges sharpened, a handle shank secured to the upper side of the blade intermediate of the ends thereof, and prongs secured to the upper side of the blade and extended upwardly and rearwardly therefrom, said prongs being arranged at spaced positions thereon and adapted to break the soil and to catch and hold weed roots for removal therefrom.

2. In a weeding hoe, a flat blade adapted for operation in a substantially horizontal position and for subsurface root cutting, a handle shank secured to the upper side of said blade intermediate of its ends, said shank being tapered and having its narrowest portion secured to the blade, and a plurality of prongs secured to the blade and extended upwardly and rearwardly therefrom, said prongs being spaced from one another and from the handle shank, said shank and prongs providing means for breaking up the soil in subsurface operation, and the prongs constituting a rake for removal of weed roots from the soil.

3. A weeding hoe, comprising a flat blade adapted for operation in a substantially horizontal position and for subsurface root cutting, a handle shank secured to the upper side of said blade intermediate of its ends, and a plurality of prongs also secured to the upper side of said blade and spaced from one another and from the handle shank, said prongs being secured to the upper sides of said blade and extended upwardly and rearwardly therefrom and providing with the handle shank means for breaking up the soil in sub-surface operation.

MICHAEL VIDMAR.